United States Patent
Young

(10) Patent No.: US 6,945,679 B2
(45) Date of Patent: Sep. 20, 2005

(54) VEHICLE TIRE ILLUMINATING APPARATUS

(76) Inventor: Raymond Young, 17923 Vintage Wood La. Cir., Spring, TX (US) 77379

( * ) Notice: Subject to any disclaimer, the term of this patent is extended or adjusted under 35 U.S.C. 154(b) by 0 days.

(21) Appl. No.: 10/172,658

(22) Filed: Jun. 17, 2002

(65) Prior Publication Data
US 2003/0231507 A1 Dec. 18, 2003

(51) Int. Cl.$^7$ .............................................. B60Q 1/26
(52) U.S. Cl. ........................ 362/500; 362/514; 362/322
(58) Field of Search ............................... 362/506, 500, 362/514, 322

(56) References Cited

U.S. PATENT DOCUMENTS

| | | | | |
|---|---|---|---|---|
| 3,947,677 A | * | 3/1976 | Steinle | 240/8.1 R |
| 4,802,069 A | * | 1/1989 | Chandler | 362/83 |
| 4,894,755 A | * | 1/1990 | Chandler | 362/83 |
| 4,953,065 A | * | 8/1990 | Kao | 362/83 |
| 5,072,340 A | * | 12/1991 | Jones | 362/80 |
| 5,548,274 A | * | 8/1996 | Anderson et al. | 340/468 |
| 5,893,638 A | * | 4/1999 | Hufner et al. | 362/506 |
| 5,966,073 A | * | 10/1999 | Walton | 340/479 |
| 6,030,106 A | * | 2/2000 | Johnson | 362/500 |
| 6,149,288 A | * | 11/2000 | Huang | 362/545 |
| 6,422,725 B1 | * | 7/2002 | Fong | 362/500 |

* cited by examiner

Primary Examiner—Sandra O'Shea
Assistant Examiner—Jacob Y. Choi
(74) Attorney, Agent, or Firm—Kenneth D. Baugh

(57) ABSTRACT

A tire illuminating apparatus 12 for illuminating the tires 14 of a vehicle 10 is provided. The tire illuminating apparatus 12 includes a base member 20 which is coupled to the vehicle 10 above the tire 14. The illuminating apparatus 12 is also provided with a light directing member 36 which is coupled to the base member 20 which directs light so that diagonally extending light beams are cast on the tire 14. An illuminating member 44 for providing a predetermined source of light is also provided. The illuminating member 44 is coupled in the base member 20 so that light is provided to the light directing member 36 to illuminate the tire 14 as desired.

9 Claims, 4 Drawing Sheets

VEHICLE TIRE ILLUMINATING APPARATUS

TECHNICAL FIELD

This invention relates to a vehicle and more particularly a vehicle illuminating apparatus to be used on the vehicle to facilitate increased visibility and safety. Vehicle safety is very important and is an ongoing and of the utmost concern in today's society. All vehicles traveling on public roads are equipped with means of providing increased visibility for the vehicle so that the safety of the vehicle is enhanced. The most common apparatus are a variety of lights which provide visual signals to pedestrians and other drivers. There are a variety of such apparatuses, such as, stop lights on the rear of the vehicle, turn signals on the front and rear of the vehicle, head lights on the front of the vehicle and in some instances even what is called running lights which run down the side of the vehicle. Although there are a number of different light illuminating arrangements to provide enhanced safety for the vehicle there is an on going need to improve the visibility of the vehicle. One way to address this need is to provide for increased visibility on the side of the vehicle to help reduce side impact crashes and accidents. Accordingly there becomes a need to provide an illuminating apparatus for making the vehicle even more visible to a pedestrian or other automobile on the road by providing enhanced side illumination of the vehicle.

BACKGROUND ART

Attempts have been made to provide devices to facilitate side illumination of a vehicle. One such device is illustrated in U.S. Pat. No. 5,966,073. In this arrangement a vehicle is provided with front side and or front mounted brake and turn signal lights. The front side mounted lights of this invention when mounted on the vehicle are generally mounted below the windshield behind the front wheel and ahead of the forward edge of the front door.

Another apparatus is disclosed in U.S. Pat. No. 5,893,638. This invention relates to a side lamp for vehicles which have an opening in their shell. It is provided as a side lamp which can be used as a turn signal, side lamp and as a side marking lamp. Although both these apparatuses provide some side illumination, side illumination for the vehicle is not the primary concern of these inventions. Thus side illumination of the vehicle in these arrangements are somewhat limited. Accordingly greater side illumination is needed and most certainty desirable.

DISCLOSURE OF THE INVENTION

A tire illuminating apparatus for illuminating the tires of a vehicle is provided. The tire illuminating apparatus of this invention includes a base member having an opening formed therein. The base member is coupled to the vehicle above the tire so that the opening in the base member is aligned with an opening in the vehicle above the tire. The illuminating apparatus is also provided with a means having an opening formed therein coupled to the base member for directing light in a predetermined direction to a predetermined position adjacent the tire. An illuminating means for providing a predetermined source of light is also provided. The illuminating means is coupled in the opening in the base member so that light is provided to the directing means to illuminate the tire as desired and thereby provide side illumination for the vehicle.

BRIEF DESCRIPTION OF THE DRAWING

The details of the invention will be described in connection with the accompanying drawing in which.

BEST MODE FOR CARRYING OUT THE INVENTION

Figure 1:
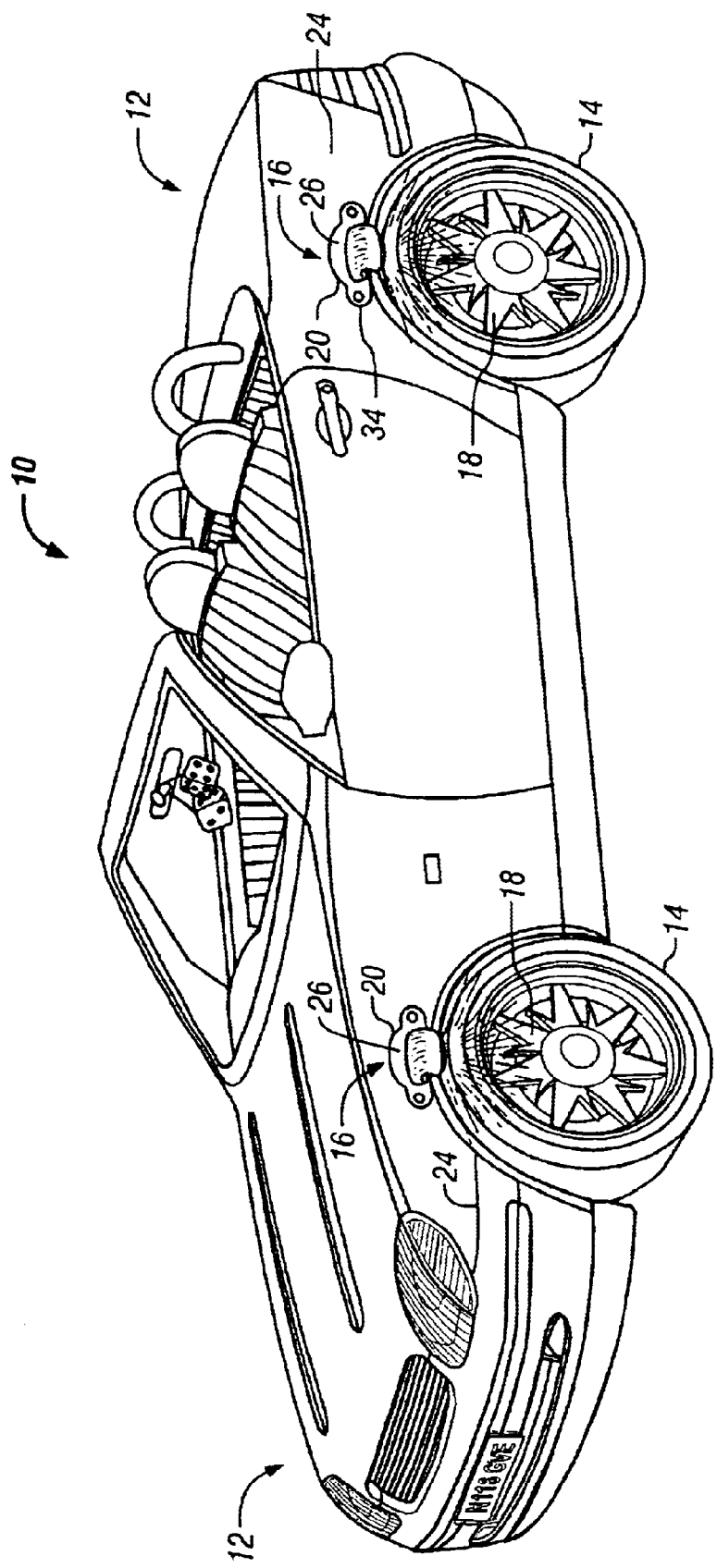
FIG. 1 is a perspective view illustrating a tire illuminating apparatus attached to a vehicle in accordance with the principles of the invention.

Referring to FIG. 1 there is shown, a vehicle, generally designated, by the numeral, 10, including a body assembly, generally designated, by the numeral, 12. The body assembly 12 is provided with a pair of spaced aligned tires 14 which are located on each side of the body assembly in a well known manner (only one side shown). A tire illuminating apparatus, generally designated, by the numeral 16 is coupled to the vehicle body assembly 12 adjacent to and above each one of the tires 14. The tire illuminating apparatus 16 is provided to facilitate the illumination of the side of the vehicle 10 by casting a diagonal extending beam of light 18 onto the tire 14 thereby illuminating the tires.

Figure 2:
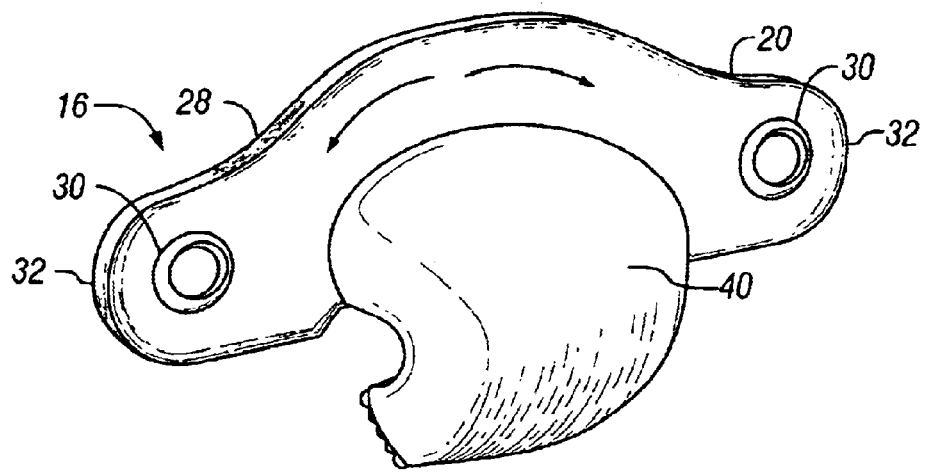
FIG. 2 is a perspective of a tire illuminating apparatus in accordance with the principles of the invention.
Figure 3:
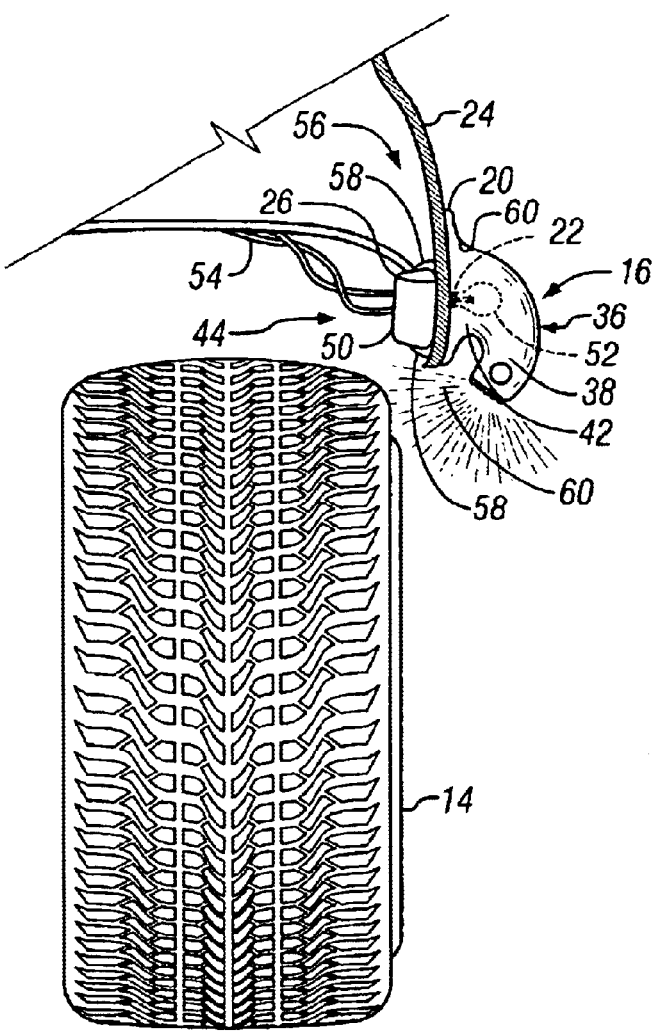
FIG. 3 is a cross-sectional view of a tire illuminating apparatus adjacent a tire of a vehicle in accordance with the principles of the invention.

As illustrated in FIGS. 1, 2 and 3 the tire illuminating apparatus 16 is provided with a base member, generally designated, by the numeral, 20, having an opening 22 formed therein (FIG. 2). The base member 20 is coupled to each side 24 of the vehicle 10 adjacent to an aperture 26 formed in the side just above each of the tires 14. The base member 20 is also provided with a gasket 28 (FIG. 2) which separates the base member 20 from the painted finish of the vehicle 10. The base member 20 also includes a plurality of appetures 30 (FIG. 2) formed therethrough on outermost ends 32 thereof to facilitate coupling of the base member to the side 24 of vehicle 10 by coupling members or screws 34.

The tire illuminating apparatus 16 is also provided with a light directing member, generally designated, by the numeral, 36 having an aperture 38 formed therein. The light directing member 36 is formed integrally with the base member 20 so that the opening 22 in the base member is in adjacent alignment with the aperture 38. The light directing member 36 is provided with a semicircular shaped upper member 40 and a substantially U-shaped lower member 42. This configuration allows the light flowing through the directing member 36 to be directed in a diagonally descending direction onto the tire 14 thereby illuminating the same.

The tire illuminating apparatus 16 also includes a light illuminating member generally designated, by the numeral, 44 (FIG. 3). The light illuminating member 44 is secured to the base member 20 in the aperture 26 formed in the side 24 of the vehicle 10. The light illuminating member 44 is provided with a bulb supporting member 50. The bulb supporting member 50 provides an electrical coupling for a bulb 52 (shown in dotted lines) in a well known manner through electrical wires 54 which are coupled to a vehicle voltage source (not shown) through a headlight switch (not shown) or other independent switching means. The light illuminating member 44 is provided with a locking assembly, generally designated, by the numeral, 56. The locking assembly 56 includes a spring biased releasing member 58 formed on each side of the bulb supporting member 50. Each releasing member 58 includes an engaging member 60 which is aligned in parallel engagement with an adjacent portion of the side 24 of the vehicle 10. Accordingly when the spring biased releasing members 58 are pressed inwardly the engaging members 60 are disengaged from the side 24 of vehicle 10 allowing the illuminating member to be released and removed from the aperture 26.

Figure 4:
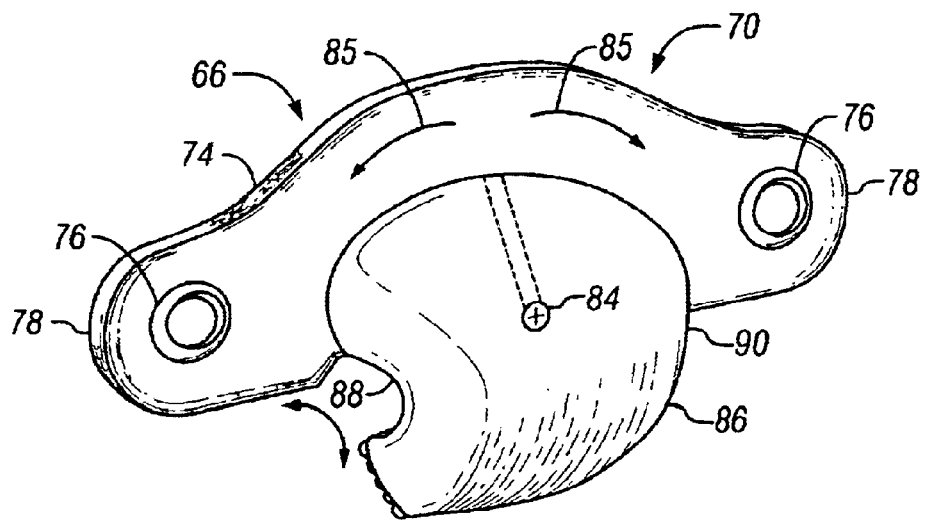
FIG. 4 is a perspective view of a second embodiment of a tire illumination apparatus in accordance with the principles of the invention.
Figure 5:
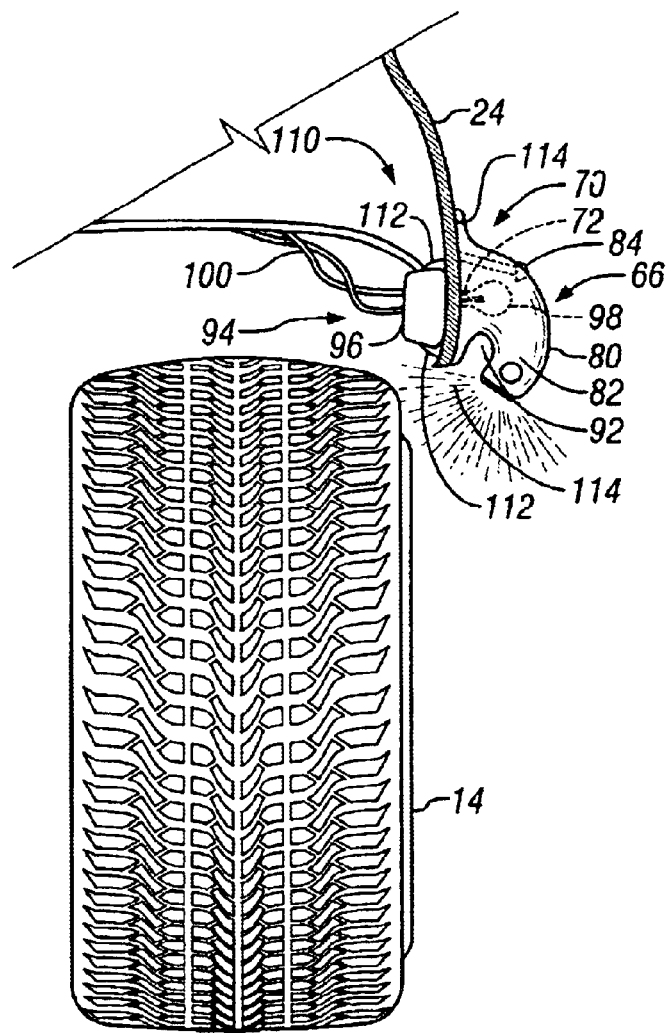
FIG. 5 is a cross-sectional view of a second embodiment of a tire illuminating apparatus adjacent a tire of a vehicle in accordance with the principles of the invention.

A second embodiment of the invention is illustrated in FIGS. 4 and 5. As illustrated the tire illuminating apparatus 66 is provided with a base member, generally designated, by the numeral, 70, having an opening 72 formed therein (FIG. 5). The base member 70 is coupled to each side 24 of the vehicle 10 adjacent to an aperture 26 formed in the side just above each of the tires 14. The base member 70 is also provided with a gasket 74 (FIG. 4) which separates the base member 70 from the painted finish of the vehicle 10. The base member 70 also includes a plurality of apertures 76 (FIG. 4) formed therethrough on outermost ends 78 thereof to facilitate coupling of the base member to the side 24 of vehicle 10 by coupling members or screws 34.

The tire illuminating apparatus 66 of this embodiment is also provided with a light directing member, generally designated, by the numeral, 80 having an aperture 82 formed therein. The light directing member 80 is pivotably coupled to the base member 70 so that the opening 72 in the base member is in adjacent alignment with the aperture 82. The light directing member 80 is pivotably coupled to the base member 70 by a pivot screw 84 so that it can be pivoted in the direction of the arrows 85 (FIG. 4). The light directing member 80 is provided with a semicircular shaped upper member 86 and a substantially U-shaped lower member 88. This configuration allows the light flowing through the member 80 to be directed in a diagonally descending direction onto the tire 14 thereby illuminating the same.

Figure 6:
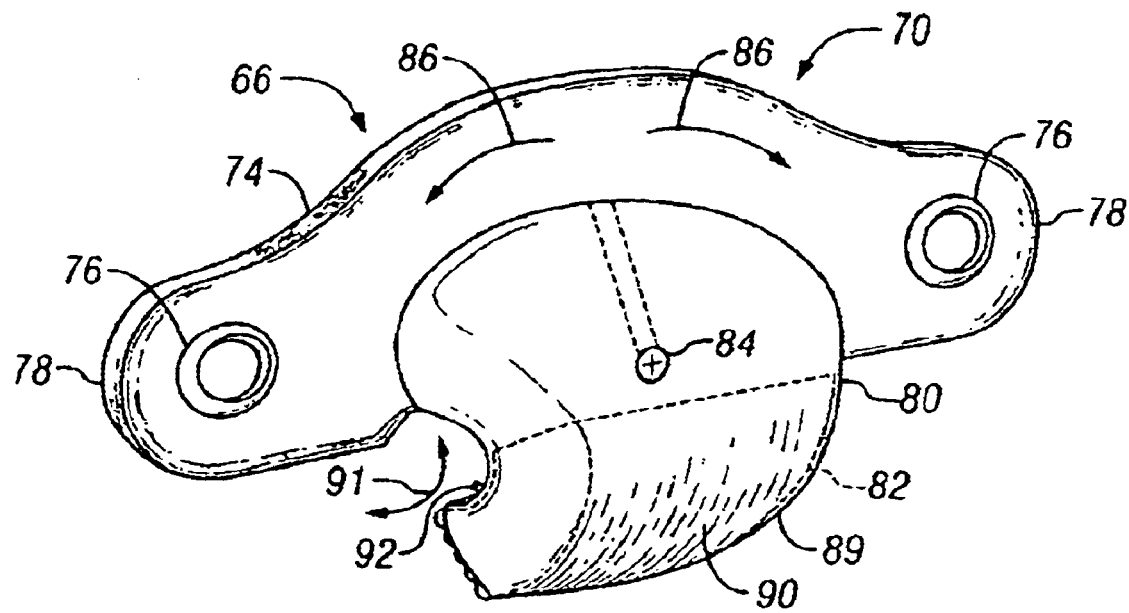
FIG. 6 is a perspective view of a third embodiment of a tire illumination apparatus in accordance with the principles of the invention.
Figure 7:
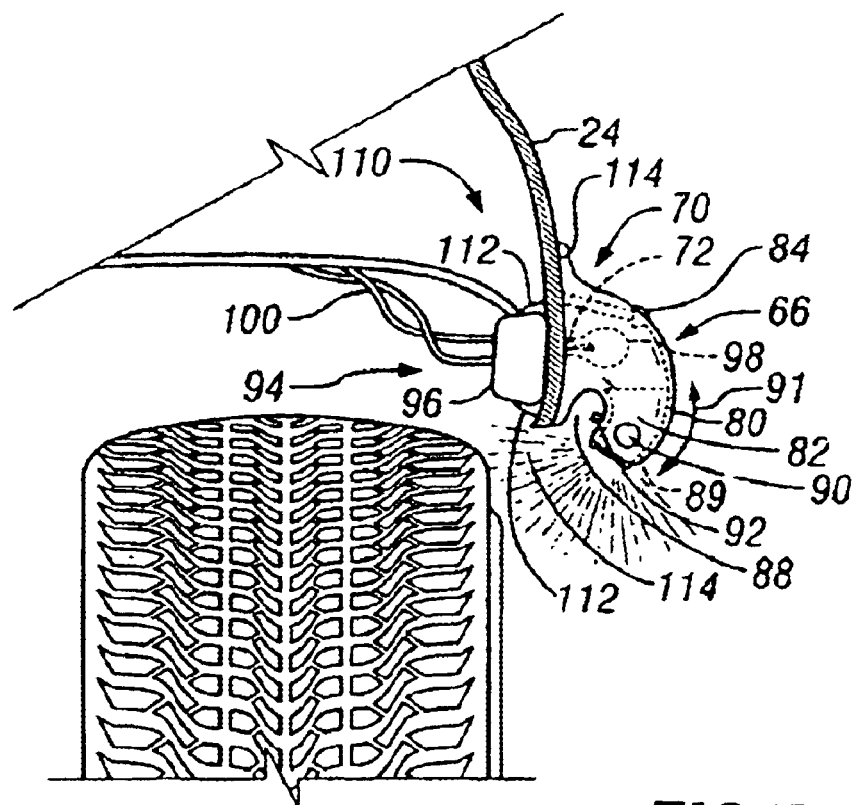
FIG. 7 is a cross-sectional view of a third embodiment of a tire illuminating apparatus adjacent a tire of a vehicle in accordance with the principles of the invention.

As illustrated in FIGS. 6 and 7 the light directing member 80 may be formed with an internal telescopic member 89 having an aperture opening 90 formed therethrough which fits in the opening 82 of the light directing member 80. The internal member 89 and the member 80 are dimensioned so that the member 89 is mounted for snug slidable engaging movement within the member 80 in the aperture 82. This permits the member 89 to be pivoted in the direction of the arrow 91 and held in that desired position to allow for vertical adjustment of the light onto the tire 14. A coupling member or screw 92 may also be provided on the lower member 89 to assure it is held in the desired pivoted position.

The tire illuminating apparatus 66 also includes a light illuminating member generally designated, by the numeral, 94. The light illuminating member 94 is secured to the base member 70 in the aperture 26 formed in the side 24 of the vehicle 10. The light illuminating member 94 is provided with a bulb supporting member 96. The bulb supporting member 96 provides an electrical coupling for a bulb 98 (shown in dotted lines) in a well known manner through the electrical wires 100 which are coupled to a vehicle voltage source (not shown) through a headlight switch (not shown). The light illuminating member 94 is provided with a locking assembly, generally designated, by the numeral, 110. The locking assembly 110 includes a spring biased releasing member 112 formed on each side of the bulb supporting member 96. Each releasing member 112 includes an engaging member 114 which is aligned in parallel engagement with an adjacent portion of the side of the vehicle 10. Accordingly when the spring biased releasing members are pressed inwardly the engaging members 114 are disengaged from the vehicle 10 allowing the illuminating member 94 to be released and removed out of the aperture 26.

As illustrated in FIG. 1, when in use the tire illuminating apparatus 12 is coupled to the side wall 20 of the vehicle 10 in the opening 26 above each of the tires 14 of the vehicle 10. Accordingly a user can then proceed to turn on the vehicle 10 light switch so that the tires are illuminated. By using this arrangement with all the tires 14 of the vehicle illuminated the side visibility of the vehicle is enhanced as well as the safety of the vehicle for the driver of the vehicle as well as others.

The invention has been shown and described in what is considered to be the most practical and preferred embodiment. However, it should be recognized that changes may be made by those skilled in the art without departing from the spirit and scope of the invention.

What is claimed:

1. A tire illuminating apparatus for illuminating the tires of a vehicle including:
    a base member having an opening formed therein;
    means for coupling the base member to the side of the vehicle above the tire so that the opening in the base member is aligned with an opening in the side of the vehicle above the tire;
    means, having an opening formed therein, for directing light in a predetermined direction to a predetermined position adjacent the tire;
    means for pivotably coupling the light directing means to the base member so that the opening in the light directing means is aligned with the opening in the base member;
    an illuminating means for providing a predetermined source of light; and
    means for coupling the illuminating means in the opening in the base member so that light is provided to the directing means to illuminate the tire.

2. A tire illuminating apparatus as defined in claim 1 wherein the base member further includes an aperture formed through each outermost end thereof for facilitating coupling of the base member of the vehicle.

3. A tire illuminating apparatus as defined in claim 2 wherein the base member includes a coupling member for engaging each aperture formed through the outermost end of the base member so that the base member is coupled to the vehicle.

4. A tire illuminating apparatus as defined in claim 3 wherein the light directing means includes:

an outer member having an opening formed therethrough; and an inner member having an opening formed therethrough mounted for slidable pivoting-movement in the outer member, the inner member being slidably pivoted in the outer member so that the light can be adjusted vertically relative to the tire.

5. A tire illuminating apparatus as defined in claim 3 wherein the outer member and the inner member of the light directing means each include:

an upper member; and a lower member formed integrally with the upper member so that an opening is formed therebetween and so that light is transmitted therethrough to cast a diagonally extending beam of light onto the tire.

6. A tire illuminating apparatus as defined in claim 5 wherein the light directing means coupling means includes a coupling member which extends through the upper member of the light directing means into the base member for facilitating the pivotable coupling of the light directing means to the base member.

7. A tire illuminating apparatus as defined in claim 6 wherein the upper members of the light directing means include:

a semi-circularly shaped member; and the lower member of the light directing means includes a substantially u-shaped member.

8. A tire illuminating apparatus as defined in claim 7 wherein the illuminating means includes a light bulb electrically coupled to a voltage source of the vehicle so that a predetermined source of light is provided.

9. A tire illuminating apparatus as defined in claim 8 wherein the illuminating means coupling means includes a pair of spring biased members for releasably engaging the vehicle adjacent the opening in the base member so that the light bulb is secured in the opening in a predetermined position.

* * * * *